Aug. 31, 1948.    N. MARCHAND    2,448,041
DIRECTION FINDER
Filed Nov. 25, 1944
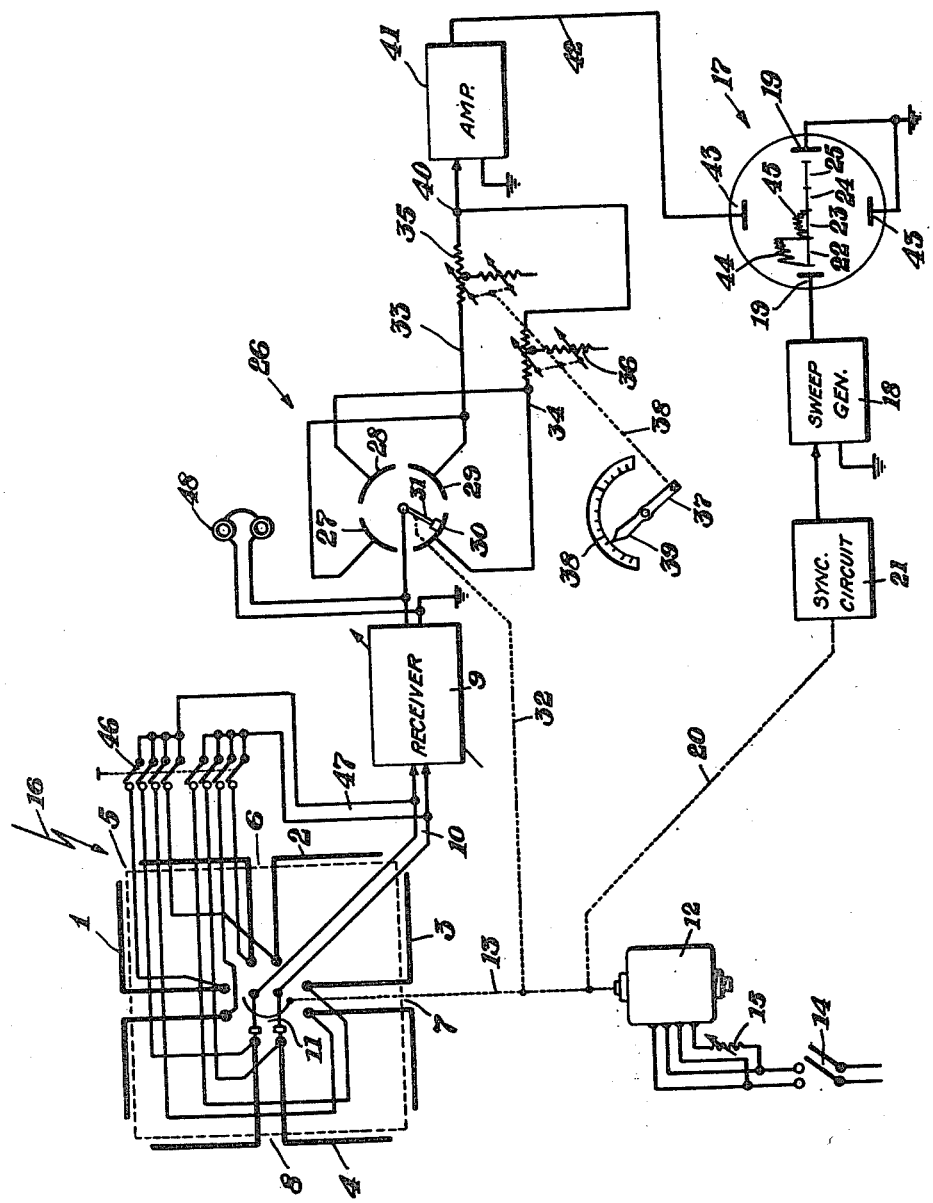
INVENTOR.
NATHAN MARCHAND
BY
R P Morris
ATTORNEY Patented Aug. 31, 1948

2,448,041

UNITED STATES PATENT OFFICE 2,448,041

DIRECTION FINDER

Nathan Marchand, New York, N. Y., assignor to Federal Telephone and Radio Corporation, New York, N. Y., a corporation of Delaware Application November 25, 1944, Serial No. 565,142

14 Claims. (Cl. 343—120)

This invention relates to radio direction finders and more particularly to radio direction finders of the amplitude comparison type.

Radio direction finders have been proposed in which the direction to a transmitting station is determined by comparison of the amplitude of energy received from the transmitter in two or more different directional characteristics. Further systems of this type have been provided in which the amplitude of energy received on a plurality of differently directed antennas is successively compared by manual switching means to determine the direction of the transmitting station with respect to the receiver. Other types of systems also are provided in which the directive characteristic of a single antenna is alternately varied in order to determine the direction by comparison of the received signal energy In many installations, however, it is not possible to use a simple antenna structure but reliance must be made upon a plurality of separate antennas each differently directed in order that all the desired directions may be properly covered. When such is the case, it is desirable to be able automatically to switch the antennas and to produce the indications without the necessity of the manual control of the directivity.

It is an object of my invention to provide a novel indicator means for indicating the relative amplitudes of two separate radio signals.

It is a further object of my invention to provide a direction finding system in which comparison of amplitude of the signals provides a directive line between the transmitter and the receiving apparatus and comparison of switch timing serves to identify the sense or sector from said receiver in which the transmitter is located.

It is a still further object of my invention to provide a system wherein energy from a plurality of antenna units, each of which is preferably uni-directional, is successively applied to an indicator to provide separate indications and in which said indications may be adjusted in amplitude to a predetermined characteristic value to provide a directional indication.

In accordance with a feature of my invention, a plurality of antennas may be arranged about a point at which the direction of the transmitter station is to be ascertained, these antennas being unidirectional. Means is provided successively to couple these antennas to a receiver for application to an oscillograph indicator. The signals from the output of the receiver are switched, synchronously with the successive coupling of the antennas, to separate transmission lines for application to the indicator, to control a characteristic of the oscilloscope beam. Simultaneously with the successive coupling of the antennas, the sweep circuit of the oscillograph indicator is controlled so as to space apart on the indicator screen the indications produced by the signals received from the separate antenna units. Accordingly, the sector in which the transmitter is located will be indicated on the oscilloscope screen by the relative position of the indications.

In order to ascertain the line of direction, variable attenuator networks are provided to control the amplitude of signal energy applied to the indicator, these attenuator networks being adjusted until the indications on the screen of the oscilloscope are controlled to equality of amplitude or to some other predetermined amplitude relationship. By providing a calibrated scale on the attenuator adjusting network, the line of direction toward the transmitter will be indicated. If it is desired to use the antenna system for communication purposes or for searching out a station upon which direction finding is to be based, the antenna units may be switched into parallel connection with the receiver. Preferably, at this time, the drive for the successive switching at the input and output of the receiver is simultaneously discontinued.

A better understanding of my invention and the objects and features thereof may be had by reference to the particular description of an embodiment thereof made with reference to the accompanying drawing the single figure of which is a schematic circuit diagram partly in block of a direction finder circuit embodying the principles of my invention.

As shown in the drawing, I provide four antenna units 1, 2, 3 and 4 each of which is rendered unidirectional by shield means 5, 6, 7 and 8, respectively. It should be understood that while four antennas are used, as illustrated, a greater or lesser number may be used as desired. A receiver 9 is adapted to be coupled to the antenna units over a transmission line 10 and a switch 11. Switch 11 is rotated at a predetermined rate of speed by means of a motor 12 and a drive shaft 13 successively to couple antenas 1, 2, 3 and 4 to the input receiver 9. The motor is connected to a power supply source by means of a main switch 14 and may be controlled in speed by variable resistance 15 in the armature of the motor. With this arrangement, it will be seen that the signal energy received on antennas 1, 2, 3 and 4 will successively be applied to the input of receiver 9.

Since the antennas are unidirectional, incoming energy coming from the angle as indicated at 10 for example, will be effective only on two of the antennas such as antennas 1 and 2. In order to determine the direction of this incoming energy, it will therefore be necessary only to compare the amplitude of energy from antennas 1 and 2. This, however, will provide only an indication of the direction line with respect to the particular quadrant in which these two antennas are effective. Similarly, energy coming in from the other directions may be effectively received only in quadrants covered by antennas 2 and 3, 3 and 4, and 4 and 1, respectively. The same amplitude comparison indications for a direction line will be produced in each of these quadrants. Consequently, in order to accurately ascertain the direction of the transmitting station it is necessary not only to determine the direction line angle of the receiver but in what direction quadrant the signal is coming.

To accomplish this separate indication, I provide an oscilloscope indicator 17 together with means for synchronizing the sweep of the beam on the oscilloscope with the successive coupling operations of switch 11 and with circuits for applying the successively received signals to the indicator to control a characteristic of the beam. The beam of indicator 17 may, for example, be controlled in horizontal deflection by sweep generator 18 coupled to the horizontal plates 19 thereof. Sweep generator 18 is preferably controlled in accordance with the rotation of switch 11 by means of a shaft 20 and a synchronizing circuit 21. With this synchronized switch circuit the beam will occupy four different switch positions on the scale as indicated at 22, 23, 24 and 25 corresponding in time with the switch coupling positions for coupling antennas 1, 2, 3 and 4, respectively, to the receiver.

In the output of the receiver is provided a switch mechanism 26 having four segments 27, 28, 29 and 30 corresponding to the switching positions of rotary switch 11 in coupling relation with antennas 1, 2, 3 and 4, respectively. The rotor 31 of switch 26 is driven in synchronism with the switch 11 by means of a drive shaft 32 and is coupled with the output of receiver 9. Since reception of signals from any one transmitter on antennas 1 and 3 and on antennas 2 and 4 is mutually exclusive one with respect to another, the corresponding segments of switches 27 and 29 may be coupled together to a single line 33 and segments 28 and 30 may be coupled together to another single line 34. In these separate lines are provided attenuator networks 35 and 36, respectively. These attenuator networks are preferably differentially adjustable by means of a control handle 37 and drive mechanism 38 so as to oppositely effect the attenuation of signals in lines 33 and 34. A calibrated scale 38 cooperating with a pointer mechanism 39 is arranged with respect to handle 37 to indicate the adjustment of attenuators 35 and 36. Preferably, scale 38 is calibrated in degrees so that the direction line in degrees will be indicated by adjustment of the attenuator networks as will be explained later.

Output sides of networks 35 and 36 may be coupled together at 40 and applied to an amplifier circuit 41. The output of amplifier 41 is applied over line 42 to the vertical deflecting plates 43 of indicator 17. It will therefore be seen that the incoming energy at 10 will produce vertical deflection of the beam in accordance with the strength of the incoming signal as shown at 44 and 45 on indicator 17. The energy incoming on antenna 1 will be greater in amplitude than that incoming on antenna 2 so that the indication 44 is higher in amplitude than indication 45. These indications, however, immediately show that the incoming signal 10 is in the quadrant covered by antennas 1 and 2. Attenuator networks 35 and 36 may then be adjusted to bring indications 44 and 45 to the same amplitude or to some desired predetermined amplitude relationship on the screen. This adjustment of the attenuators and consequently point 39 on scale 38 will indicate the direction line to the transmitter.

While the circuit arrangement so far described provides all of the direction finding indications necessary, it may be desired to operate the system as an omni-directional receiver for communication purposes or for the purpose of tuning the receiver to locate a particular signal within the frequency band of the receiver. To this end, antennas 1, 2, 3 and 4 may be coupled together in parallel by means of the multiple gang switch shown at 46 and to the input of receiver 9 by means of line 47. When so coupled in parallel the antennas will provide an omni-directional pattern. In order that the signals received may be used for communication purposes, a pair of headphones 48 may be coupled to the output of receiver 9. Likewise, receiver 9 is made tunable and may be tuned to a desired frequency. Preferably when switch 46 is operated to couple the antennas in parallel, switch 15 may be opened to discontinue rotation of motor 12 and the switching operation of switches 11 and 26. This will likewise discontinue the operation of synchronizing circuit 21 but sweep generator 18 may continue to produce a sweep of the oscilloscope beam across the screen. As receiver 9 is tuned, the output signals thereof will accordingly be applied to the vertical deflecting plates 43 of indicator 17 so that another signal can be observed. The tuning of receiver 9 may be continued until some received signal is indicated on indicator 17. At this time then, switch 15 may be closed and switch 46 opened after which the direction of the transmitter of the signals received may be ascertained.

While I have disclosed my invention in connection with a particular type of apparatus, it is clear that many modifications thereof will occur to those skilled in the art. For example, instead of using a deflection control for producing indications on the oscillograph screen, other known methods such as control of beam intensity may be used if desired. The intensity control system, however, is not so desirable since it is difficult to ascertain when the brilliance of two spots on the indicator are the same. The comparison of amplitude levels of the deflections is much easier to make. It should further be understood that various types of antennas may be provided as desired. Likewise, the sectors covered by the various antenna units need not be quadrants as shown but may be lesser or greater numbers of sectors as desired. Moreover, the novel features of the amplitude comparison system and/or its use in conjunction with a separate indicator for separating the signals to be compared may be used in connection with other types of apparatus and direction finding systems.

While I have described a specific working embodiment of my invention as applied to direction finder arrangements, it should be distinctly understood that this example is given merely by way of illustration and is not to be considered a limitation on my invention as defined in the objects thereof and in the accompanying claims.

I claim:

1. An amplitude comparison system comprising a cathode ray tube indicator having a viewing screen, means for alternately applying signals, the amplitudes of which are to be compared, to said indicator, sweep generator means synchronized with said means for applying to provide separate indications of each of said signals on different portions of said screen, variable attenuator means in the path of each of said signals, and means simultaneously and oppositely to adjust the attenuation characteristics on said attenuator means to provide a predetermined relationship of indications on said indicator from said signals, whereby the difference in amplitude of said signals will be indicated by the attenuator adjustment.

2. In an amplitude comparison system for indicating relative amplitude of signals to be compared on a cathode ray tube having a viewing screen, the method comprising, alternately applying said signals to said cathode ray tube positioning said indications in spaced relation on said screen in synchronism with the application of said signals, and adjusting the amplitude of at least two of said indications to a predetermined value to provide a comparison of said amplitudes.

3. Means for indicating the direction line to a given transmitter, and the directive sector in which said transmitter lies, comprising an indicator, means for successively coupling a plurality of differently directed antennas to said indicator to provide indications, means for controlling said indicator to separate signals received on said successively coupled antennas to indicate the sector from which the signals arrive, and means for adjusting the amplitude of the indications on said indicator to a predetermined relationship to provide an indication of the direction line to said transmitter.

4. In a system for indicating the direction line to a given transmitter and the directive sector in which said transmitter lies, by amplitude comparison of directively received energy in the different sectors, the method comprising successively producing indications in response to energy received in said different sectors, separately positioning said produced indications in accordance with the sector in which they are received, and adjusting the amplitude of the indications to a predetermined relationship to indicate the direction line.

5. An indicating system for producing an indication of signals received on different antenna means comprising a receiver, means for successively coupling said antenna means to said receiver, an oscillograph indicator, means for producing a sweep of the beam of said oscillograph in synchronism with said successive coupling to position said beam differently for reception from different antennas, and means for coupling the output of said receiver to said indicator to control a characteristic of said beam, whereby indications corresponding to signals received on different antennas will be produced on the screen of said oscillograph in predetermined respective positions thereon means adjustably to control the attenuation of the signals applied to said indicator, and means for indicating direction by the adjustment of said last-named means.

6. A system for obtaining a directional indication by amplitude comparison of directively received signals, comprising an oscillograph indicator, a sweep circuit for said indicator for sweeping the beam of said oscillograph over the screen of said indicator, means for alternately applying said signals to said indicator to control a characteristic of said beam to produce indications on the screen, means for synchronizing said sweep circuit with the alternate application of said signals to assure spacing of said indications, means to adjustably control the attenuation of said signals to produce a predetermined relationship of said indications to provide a directional indication and means for indicating in response to said adjustment the direction of the signal source.

7. A direction finder for providing an indication of the direction of a transmitter by means of received signals, comprising four substantially unidirectional antennas positioned to receive signals approaching from four different quadrants, a receiver means, means for successively coupling said antennas to said receiver means, an oscilloscope indicator, means for sweeping the beam of said oscilloscope across the screen thereof in synchronism with the coupling of said antennas whereby the position of said beam will correspond to the coupled antenna, switching means in the output of said receiver means operated synchronously with the successive coupling means to apply the output energy received from successive antennas to different lines, separate adjustable attenuator networks in said lines, means for coupling said lines in parallel to said indicator to control a characteristic of said beam in accordance with the amplitude of the received signals, whereby an indication of signals received from each quadrant will be produced in the corresponding sweep position of the beam of said indicator, and means for adjusting said attenuators to provide an equality of signal indications in two quadrants to indicate the direction of said transmitter.

8. In an amplitude comparison system for indicating on an oscilloscope screen relative amplitude of signals to be compared, the method comprising, successively controlling a characteristic of the oscillograph beam in response to said signals to produce indications on said screen, cyclically deflecting said beam across said screen in synchronism with the successive control of said beam to position said indications in spaced relation, and adjusting the amplitude of at least two of said indications to a predetermined value to provide a comparison of said amplitudes.

9. In a system for indicating the direction line to a given transmitter and the directive sector in which said transmitter lies, by amplitude comparison of directively received energy in the different sectors, the method comprising successively producing indications in response to energy received in said different sectors, positioning said produced indications in accordance with the sector in which they are received, and differentially controlling the amplitude of energy from the different sectors to adjust the amplitude of the indications to a predetermined relationship to indicate the direction line.

10. In a system for indicating the direction line to a given transmitter and the directive sector in which said transmitter lies, by amplitude comparison on an oscilloscope screen of directively received energy in the different sectors, the method comprising successively producing indications on said screen in response to energy received in said different sectors, controlling the sweep of the oscilloscope beam to position said produced indications on said screen in accordance with the sector in which they are received, and differentially controlling the amplitude of energy received from said different sectors to adjust the amplitude of the indications to a predetermined relationship to indicate the direction line.

11. Direction indicating means for indicating the direction line to a given transmitter, and the directive sector in which said transmitter lies, comprising a radio receiver, a plurality of differently directed antennas, means for successively coupling respective ones of said antennas to said receiver, an indicator coupled to the output of said receiver to provide indications responsive to energy from said successively coupled antennas, means for controlling said indicator to position the indications in predetermined locations on said indicator to indicate the sector from which the signals arrive, and means for adjusting the amplitude of energy from said successively coupled antennas to control the indications on said indicator to a predetermined relationship to provide an indication of the direction line to said transmitter.

12. Direction indicating means according to claim 11 further comprising means for coupling said antennas in parallel to said receiver to provide simultaneous reception of energy arriving over the complete angle covered by all said antennas.

13. Direction indicating means for indicating the direction line to a given transmitter, and the directive sector in which said transmitter lies, comprising a radio receiver, a plurality of differently directed antennas, the directive patterns of which overlap those of the next adjacent antennas to define sectors, means for successively coupling said differently directed antennas to said receiver, an oscilloscope indicator coupled to the output of said receiver, whereby the beam of said oscilloscope is controlled in one characteristic by received signal energy, means for sweeping the beam of said oscilloscope across its screen to separate the indications produced from the successively coupled antennas to indicate the sector from which the signals arrive, and means for adjusting the amplitude of the indications on said indicator to a predetermined relationship to provide an indication of the direction line to said transmitter.

14. A system according to claim 13 further comprising means for discontinuing operation of said means for successively coupling said antennas and means for coupling said antennas in parallel to the input of said receiver to provide an omnidirectional reception over all the sectors.

NATHAN MARCHAND.

REFERENCES CITED

The following references are of record in the file of this patent:

UNITED STATES PATENTS

| Number | Name | Date |
| --- | --- | --- |
| 1,565,177 | MacKenzie | Dec. 8, 1925 |
| 2,089,430 | Roys et al. | Aug. 10, 1937 |
| 2,126,929 | Snow et al. | Aug. 16, 1938 |
| 2,146,862 | Shumard | Feb. 14, 1939 |
| 2,312,203 | Wallace | Feb. 23, 1943 |
| 2,312,761 | Hershberger | Mar. 2, 1943 |

FOREIGN PATENTS

| Number | Country | Date |
| --- | --- | --- |
| 319,715 | Great Britain | Sept. 27, 1929 |